United States Patent
Schmitz et al.

(10) Patent No.: US 6,780,254 B1
(45) Date of Patent: Aug. 24, 2004

(54) METHOD AND FACILITY FOR LUBRICATING AND CLEANING FILLING FACILITIES FOR BEVERAGES OR FOODSTUFFS

(75) Inventors: Karl-Heinz Schmitz, Erkrath (DE); Harald Kluschanzoff, Mettmann (DE); Thomas Wershofen, Monchengladbach (DE)

(73) Assignee: Ecolab GmbH & Co. OHG, Dusseldorf (DE)

(*) Notice: Subject to any disclaimer, the term of this patent is extended or adjusted under 35 U.S.C. 154(b) by 0 days.

(21) Appl. No.: 09/980,977

(22) PCT Filed: May 3, 2000

(86) PCT No.: PCT/EP00/03948
§ 371 (c)(1),
(2), (4) Date: Feb. 19, 2002

(87) PCT Pub. No.: WO00/70002
PCT Pub. Date: Nov. 23, 2000

(30) Foreign Application Priority Data

May 12, 1999 (DE) .......................................... 199 21 709

(51) Int. Cl.⁷ .............................. B08B 1/02; B08B 3/04
(52) U.S. Cl. ............................. 134/15; 134/26; 134/28; 134/32; 134/18
(58) Field of Search .............................. 134/15, 18, 26, 134/28, 32

(56) References Cited

U.S. PATENT DOCUMENTS

| | | |
|---|---|---|
| 4,839,067 A | 6/1989 | Jansen |
| 4,960,200 A | 10/1990 | Pierce |
| 5,758,761 A * | 6/1998 | Selbertinger et al. ....... 198/495 |
| 5,935,914 A * | 8/1999 | Theyssen et al. ........... 508/517 |

FOREIGN PATENT DOCUMENTS

| | | |
|---|---|---|
| DE | 34 31 953 A1 | 3/1988 |
| DE | 36 31 953 A1 | 3/1988 |
| DE | 39 05 548 A1 | 6/1990 |
| DE | 42 06 506 A1 | 9/1993 |
| DE | 43 32 128 A1 | 3/1995 |
| DE | 42 44 536 C2 | 5/1995 |
| DE | 196 42 598 | 4/1998 |
| EP | 0 372 628 | 6/1990 |
| EP | 0 629 234 B1 | 12/1994 |
| WO | WO 94/03562 | 2/1994 |
| WO | WO 95/08497 | 3/1995 |
| WO | WO 98/56881 | 12/1998 |

* cited by examiner

Primary Examiner—Zeinab El-Arini
(74) Attorney, Agent, or Firm—Merchant & Gould P.C.

(57) ABSTRACT

The invention relates to a method for lubricating and cleaning and/or disinfecting filling facilities for containers receiving beverages or foodstuffs, wherein the containers are conveyed on transport devices which are brought into contact with an aqueous solution of a conveyor lubricant during operation for the purpose of lubrication, wherein said aqueous solution is produced by diluting a product concentrate with water at a first dilution factor. The transport devices and/or the devices connected thereto are cleaned and/or disinfected during preselected time intervals and without interrupting the filling and transport operation by using the product concentrate for cleaning and/or disinfecting the transport devices and/or the devices connected thereto once said product concentrate has been diluted with water at a second dilution factor that is smaller than the first dilution factor.

17 Claims, No Drawings

METHOD AND FACILITY FOR LUBRICATING AND CLEANING FILLING FACILITIES FOR BEVERAGES OR FOODSTUFFS

This invention relates to a process and an installation for lubricating and for cleaning and/or disinfecting filling lines for containers for holding beverages or foods, the cleaning and/or disinfection cycle taking place during the actual filling and conveying of the particular containers. Accordingly, production no longer has to be interrupted after just a few hours for the purpose of cleaning and/or disinfecting the filling line. The invention may be used in particular for automatic chain and belt lubricating systems of the type used in the packaging of foods, preferably beverages, in glass and plastic bottles, cans, glasses, casks, kegs, paper and paperboard containers and the like.

In bottle cellars and cask cellars of beverage factories and in the packaging of foods, conveyor belts or other conveyor installations lubricated with suitable water-based lubricant preparations via automatic belt lubrication systems are normally used for transporting the corresponding containers.

At present, conveyor lubricants based on fatty amines are mainly used for this purpose. Thus, DE-A-36 31 953 describes a process for lubricating chain-type bottle conveyors in bottling factories, more particularly in breweries, which is characterized in that the chain-type bottle conveyors are lubricated with conveyor lubricants based on neutralized primary fatty amines which preferably contain 12 to 18 carbon atoms and which have an unsaturated component of more than 10%.

EP-A-0 372 628 discloses fatty amine derivatives corresponding to the following formulae:

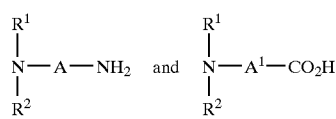

in which
$R^1$ is a saturated or unsaturated, branched or linear alkyl group containing 8 to 22 carbon atoms,
$R^2$ is hydrogen, an alkyl or hydroxyalkyl group containing 1 to 4 carbon atoms or —A—$NH_2$,
A is a linear or branched alkylene group containing 1 to 8 carbon atoms and
$A^1$ is a linear or branched alkylene group containing 2 to 4 carbon atoms, as lubricants.

In addition, lubricants based on N-alkylated fatty amine derivatives which contain at least one secondary and/or tertiary amine are known from DE-A-39 05 548.

DE-A-42 06 506 relates to lubricants based on amphoteric compounds, primary, secondary and/or tertiary amines and/or salts of such amines corresponding to general formulae (I), (IIa), (IIb), (IIIa), (IIIb), (IIIc), (IVa) and (IVb):

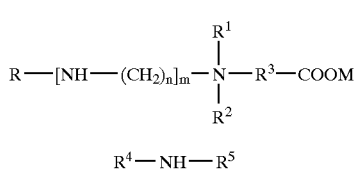

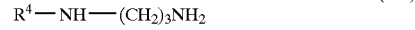

in which
R is a saturated or mono- or polyunsaturated, linear or branched alkyl group containing 6 to 22 carbon atoms which may optionally be substituted by —OH, —$NH_2$, —NH—, —CO—, —$(CH_2CH_2O)_l$— or —$(CH_2CH_2CH_2O)_l$—,
$R^1$ is hydrogen, an alkyl group containing 1 to 4 carbon atoms, a hydroxyalkyl group containing 1 to 4 carbon atoms or a group —$R^3$COOM,
$R^2$ is hydrogen, an alkyl group containing 1 to 4 carbon atoms or a hydroxyalkyl group containing 1 to 4 carbon atoms, but only where M represents a negative charge,
$R^3$ is a saturated or mono- or polyunsaturated, linear or branched alkyl group containing 1 to 12 carbon atoms which may optionally be substituted by —OH, —$NH_2$, —NH—, —CO—, —$(CH_2CH_2O)_l$— or —$(CH_2CH_2CH_2O)_l$—,
$R^4$ is a substituted or unsubstituted, linear or branched, saturated or mono- or polyunsaturated alkyl group containing 6 to 22 carbon atoms which may contain at least one amine, imine, hydroxy, halogen and/or carboxy group as substituent, a substituted or unsubstituted phenyl group which may contain at least one amine, imine, hydroxy, halogen, carboxy and/or a linear or branched, saturated or mono- or polyunsaturated alkyl group containing 6 to 22 carbon atoms as substituent,
$R^5$ is hydrogen or—independently of $R^4$—has the same meaning as $R^4$,
$X^-$ is an anion from the group consisting of amidosulfonate, nitrate, halide, sulfate, hydrogen carbonate, carbonate, phosphate or $R^6$—$COO^-$ where
$R^6$ is hydrogen, a substituted or unsubstituted, linear or branched alkyl group containing 1 to 20 carbon atoms or alkenyl group containing 2 to 20 carbon atoms, which may contain at least one hydroxy, amine or imine group as substituent, or a substituted or unsubstituted phenyl group which may contain an alkyl group with 1 to 20 carbon atoms as substituent, and
$R^7$ and $R^8$ independently of one another represent a substituted or unsubstituted, linear or branched alkyl group containing 1 to 20 carbon atoms or alkenyl group containing 2 to 20 carbon atoms which may contain at least one hydroxy, amine or imine group as substituent, or a substituted or unsubstituted phenyl group which may contain an alkyl group with 1 to 20 carbon atoms as substituent,
M is hydrogen, alkali metal, ammonium, an alkyl group containing 1 to 4 carbon atoms, a benzyl group or a negative charge,
n is an integer of 1 to 12,
m is an integer of 0 to 5 and
l is a number of 0 to 5,
containing alkyl dimethylamine oxides and/or alkyl oligoglycosides as nonionic surfactants.

EP-B-629 234 discloses a lubricant combination consisting of a) one or more compounds corresponding to the following formula:

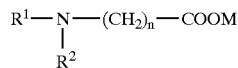

in which

R$^1$ is a saturated or mono- or polyunsaturated, linear or branched alkyl group containing 6 to 22 carbon atoms which may optionally be substituted by —OH, —NH$_2$—, —NH—, —CO—, halogen or a carboxyl group, R$^2$ is a carboxyl group containing 2 to 7 carbon atoms, M is hydrogen, alkali metal, ammonium, an alkyl group containing 1 to 4 carbon atoms or a benzyl group and n is an integer of 1 to 6, b) at least one organic carboxylic acid selected from monobasic or polybasic, saturated or mono- or polyunsaturated carboxylic acids containing 2 to 22 carbon atoms, c) optionally water and additives and/or auxiliaries.

WO 94/03562 describes a lubricant concentrate based on fatty amines and optionally typical diluents or auxiliaries and additives, characterized in that it contains at least one polyamine derivative of a fatty amine and/or a salt of such an amine, the percentage content of the polyamine derivatives of fatty amines in the formulation as a whole being from 1 to 100% by weight.

In one preferred embodiment of WO 94/03562, this lubricant concentrate contains at least one polyamine derivative of a fatty amine corresponding to the following general formula:

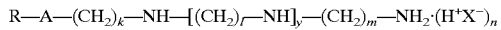

in which

R is a substituted or unsubstituted, linear or branched, saturated or mono- or polyunsaturated alkyl group containing 6 to 22 carbon atoms, the substituents being selected from amino, imino, hydroxy, halogen and carboxy, or a substituted or unsubstituted phenyl group, the substituents being selected from amino, imino, hydroxy, halogen, carboxy and a linear or branched, saturated or mono- or polyun- saturated alkyl group containing 6 to 22 carbon atoms, A represents either —NH— or —O—, X$^-$ is an anion of an inorganic or organic acid, k, l and m independently of one another are integers of 1 to 6, y is 0, 1, 2 or 3 where A=—NH— or 1, 2, 3 or 4 where A=—O— and n is an integer of 0 to 6.

DE-C-42 44 536 relates to a water-based lubricant for bottle conveyor belts containing at least one alkyldiamine corresponding to the general formula H$_{2n+1}$C$_n$—NH—(CH$_2$)$_x$—NHR, where n is a number of 8 to 20 and x is a number of 1 to 5 and R is a hydrogen atom or an alkyl group containing 1 to 20 carbon atoms, the salt of the alkyldiamine and an organic acid and optionally an organic acid and at least one ether carboxylic acid corresponding to the following general formula:

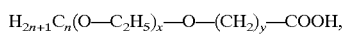

where n is a number of 10 to 20, x is a number of 1 to 20 and y is a number of 0 to 5.

DE-A-36 31 953 describes a process for lubricating chain-form bottle conveyor belts in bottling factories and for cleaning the belts with a liquid cleaning preparation, the chain-form bottle conveyor belts being lubricated with conveyor lubricants based on neutralized primary fatty amines and cleaned with cationic cleaning preparations or organic acids. Accordingly, the document in question describes a process which uses a combination of a conveyor lubricant and an adapted cleaning preparation. However, this means that the bottling and conveying process has to be interrupted for the cleaning step.

A product information pamphlet from Diversey GmbH on the conveyor lubricant Dicolube® RS 148 states that conveyor installations have to be thoroughly cleaned if a switch is to be made from other chain lubricants to this product. It is disclosed that the product Dicolube® RS 148 is a suitable cleaner in the form of 5 to 10% solutions. This concentration is well above the concentration used for belt lubrication. However, the pamphlet in question does not indicate that the concentration of the lubricant can be increased for cleaning purposes without interrupting production, i.e. while conveying and bottling are in progress.

By contrast, the problem addressed by the present invention was to provide a process and an installation for lubricating and for cleaning and/or disinfecting filling lines for containers for holding beverages or foods which would allow continuous bottling and conveying for at least several days. This would overcome the existing disadvantage of belt lubrication processes that the conveyor installations have to be stopped after only a few hours' production for the purpose of cleaning and/or disinfection.

In a first embodiment, the present invention relates to a process for lubricating and for cleaning and/or disinfecting filling lines for containers for holding beverages or foods where the containers are transported on conveyors which—for lubrication—are contacted in operation with an aqueous solution of a conveyor lubricant, characterized in that the aqueous solution is prepared by dilution of a product concentrate with water by a first dilution factor and in that the conveyors and/or facilities connected to them are cleaned and/or disinfected after preselected time intervals without any break in the container filling and transport process by using the product concentrate to clean and/or disinfect the conveyors and/or facilities connected to them after dilution with water by a second dilution factor which is smaller than the first dilution factor.

The conveyors may be conventionally constructed and include, for example, conveyor chains, conveyor belts, platform conveyors and the like.

Accordingly, a crucial aspect of the invention is that the same product concentrate may be used to lubricate the belts during normal container filling and transport and to clean and/or disinfect them at regular intervals by increasing the product concentration without the container filling and transport process having to be interrupted for that purpose. The first dilution factor for diluting the product concentrate to the lubricant concentration on the one hand and the second dilution factor for dilution to the cleaning and/or disinfecting concentration on the other hand are preferably selected so that the first dilution factor is 5 to 100 times greater than the second dilution factor. In other words, for dilution to the lubricant concentration, the product concentrate is diluted 5 to 100 times more strongly than for dilution to the cleaning and/or disinfecting concentration. The first dilution factor is preferably between about 100 and 1000 and more particularly between about 300 and 500. The second dilution factor is preferably adjusted to between 10 and 100 and more particularly to between 30 and 50.

The water used to dilute the product concentrate to lubricant concentration normally has the temperature at which it can be taken from a fresh water supply. Water with the same temperature or heated water may be used for the cleaning and/or disinfecting step. In general, the cleaning/ disinfecting step may be carried out by diluting the product concentrate with water having a temperature of 5 to 80° C. However, efficiency is improved if water heated for this step is used to dilute the product concentrate by the second dilution factor. Water with a temperature of about 30 to about 60° C. is preferably used for this purpose.

The process according to the invention is preferably carried out using a product concentrate containing 0.5 to 99.5% by weight of one or more lubricating components selected from ether amines, ether diamines, ether polyamines, mono-, di- or polyamines and imidazole derivatives each containing at least one alkyl group with 6 to 22 carbon atoms and/or salts thereof and 0.5 to 90% by weight of one or more so-called clear solubility improvers selected from amphoteric surfactants and ether carboxylic acids, the balance to 100% by weight consisting of water and/or other active substances or auxiliaries.

In one particular embodiment, the process according to the invention is carried out using a product concentrate containing 1 to 40% by weight and preferably 3 to 20% by weight of one or more lubricating components selected from ether amines, ether diamines, ether polyamines, mono-, di- or polyamines and imidazole derivatives each containing at least one alkyl group with 6 to 22 carbon atoms and/or salts thereof and 1 to 50% by weight and preferably 2 to 20% by weight of one or more dear solubility improvers selected from amphoteric surfactants and ether carboxylic acids, the balance to 100% by weight consisting of water and/or other active substances or auxiliaries.

The quantity ratio between lubricating components and clear solubility improvers is preferably in the range from 0.2:1 to 1:0.2 and more particularly in the range from 0.5:1 to 1:0.5. Clear solubility improvers are also known as components of conventional chain lubricants where they provide for better stability of the in-use solution. According to the present invention, the relatively large addition of clear solubility improvers enables the product concentrate to be used on the one hand as a lubricant and on the other hand as a cleaner/disinfectant during bottling.

The other active substances or auxiliaries mentioned include in particular nonionic and/or amphoteric surfactants, for example alkoxylated fatty amines, fatty alcohols and alkoxylated fatty alcohols. These surfactants can improve the wetting of the chain and platform conveyors should this ever be necessary. In general, surfactant additions of 0.1 to 15% by weight, based on the product concentrate, are sufficient for this purpose.

The amine compound used as the lubricating component is preferably selected from compounds belonging to the groups of ether amines, ether diamines, ether polyamines, mono-, di- or polyamines and imidazole derivatives each containing at least one alkyl group with 6 to 22 carbon atoms and/or salts thereof with the following general formulae:

A) $R-NH-(CH_2)_r-NH_2$ (1a)

$R-NH-(CH_2)_r-N^+H_3\ X^-$ (1b)

$R-N^+H_2-(CH_2)_r-N^+-H_3\ 2X^-$ (1c),

B) $R-NH-[(CH_2)_r-NH]_y-(CH_2)_m-NH_2$ (2a)

$R-NH-[(CH_2)_r-NH]_y-(CH_2)_m-NH_2\cdot(H^+X^-)_n$ (2b)

C) $R-O-[(CH_2)_r-NH]_p-(CH_2)_m-NH_2$ (3a)

$R-O-[(CH_2)_r-NH]_p-(CH_2)_m-NH_2\cdot(H^+X^-)_n$ (3b)

D) $R-NY_2$ (4)

E)
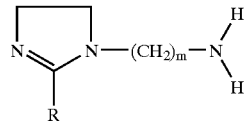
(5)

in which the substituents R represent
a linear or branched, saturated or mono- or polyunsaturated alkyl group containing 6 to 22 carbon atoms,
the substituents Y independently of one another represent hydrogen or a methyl group,
X⁻ is an equivalent of an anion from the group consisting of amidosulfonate, nitrate, halide, sulfate, hydrogen carbonate, carbonate, phosphate or carboxylate,
m, r and y independently of one another are integers of 1 to 6,
p is 0 or an integer of 1 to 6 and
n in B) is an integer of 1 to 2+y and, in C), an integer of 1 to 1+p.

The components used as clear solubility improvers are preferably selected from ether carboxylic acids corresponding to the following general formula:

F) $H_{2n+1}C_n-(O-CHY-CH_2)_x-O-(CH_2)_y-COOH$ (6)

where Y is hydrogen or a methyl group, n is a number of 10 to 20, x is a number of 1 to 20 and y is a number of 1 to 5, and from amphoteric surfactants corresponding to the following general formulae:

G)

$R-N^+\begin{pmatrix}R^1\\|\\\ \\|\\R^2\end{pmatrix}-(CH_2)_r-COO^-$ (7a)

$R-N^+\begin{pmatrix}R^1\\|\\\ \\|\\R^2\end{pmatrix}-(CH_2)_r-SO_3^-$ (7b)

$R-C(O)-NH-(CH_2)_r-N^+\begin{pmatrix}R^1\\|\\\ \\|\\R^2\end{pmatrix}-(CH_2)_m-COO^-$ (7c)

$R-N\begin{pmatrix}Z\\|\\\ \\|\\(CH_2)_m-COOH\end{pmatrix}$ (7d)

where the substituents R represent
a linear or branched, saturated or mono- or polyunsaturated alkyl group containing 8 to 22 carbon atoms,
Z has the same meaning as $R^1$ or is a group with the formula $-(CH_2)_m-COOH$,
$R^1$ and $R^2$ independently of one another represent hydrogen, methyl, ethyl, hydroxyethyl or alkoxylate groups and
r and m independently of one another are integers of 1 to 6.
Both in the lubricating components and in the clear solubility improvers, the substituent R is preferably a linear or branched, saturated or mono- or polyunsaturated alkyl group containing 12 to 22 carbon atoms. However, alkyl groups containing from 6 carbon atoms may also be used. Suitable substituents R are in particular n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-uneicosyl and n-docosyl and the branched-chain isomers of the alkyl groups mentioned. Instead of the saturated alkyl groups, R may also represent the corresponding mono- or polyunsaturated alkyl groups which may also be linear or branched. The groups mentioned above may also be substituted, in which case suitable substituents are one or more amine, imine, hydrogen, halogen or carboxy groups. These compounds are all known for use in conveyor lubricants.

If the acid substituent $X^-$ is a carboxylate ion, it is preferably one of the following carboxylate ions: formate, acetate, oxalate, lactate or an anion of malic acid, tartaric acid or citric acid. Acetate is particularly preferred.

m, r and y are preferably integers of 1 to 3. In a particularly preferred embodiment, r and m preferably have a value of 3, i.e. propylene groups are preferably present at the corresponding positions.

In a second embodiment, the present invention relates to an installation for carrying out the process according to the invention. Accordingly, the invention also relates to an installation for cleaning and/or disinfecting and lubricating filling lines for containers for holding beverages or foods where the containers are transported on conveyors, characterized in that it comprises a) one or more nozzles for spraying the surface of the conveyor with an aqueous solution,
b) one or more dosing stations provided with i) at least a first dosing pump in at least one dosing station for diluting the aqueous solution mentioned to conveyor lubricant concentration, ii) at least a second dosing pump in at least one dosing station for diluting the aqueous solution mentioned to cleaning and/or disinfecting concentration or with at least one dosing pump of which the dosing ratio can be switched to dilute the aqueous solution mentioned to conveyor lubricant concentration and to cleaning and/or disinfecting concentration,
c) a pipe system for carrying the aqueous solution mentioned from the dosing stations to the nozzles.

The conveyors can again be of various types and include, for example, conveyor chains, conveyor belts, platform conveyors and the like. Nozzles for spraying the surface of the conveyor with an aqueous solution are normally present because the lubricant solutions are applied in this way. These nozzles may also be used to apply the product concentrate diluted to cleaning and/or disinfecting concentration to the surface of the conveyor.

In an alternative embodiment of the invention, at least a first dosing pump is provided in at least one dosing station for diluting the aqueous solution to conveyor lubricant concentration and at least a second dosing pump is provided in at least one dosing station for diluting the aqueous solution to cleaning and/or disinfecting concentration. Accordingly, this embodiment is characterized by the provision of at least two different dosing pumps of which the dosing ratio can be adjusted in advance. In the process according to the invention, the dosing ratios differ by a factor of 5 to 100. Alternatively, however, one or more dosing pumps of which the dosing ratio can be switched to dilute the aqueous solution to conveyor lubricant concentration and to cleaning and/or disinfecting concentration may be used in accordance with the invention. Accordingly, this dosing pump dispenses different quantities of the product concentrate according to the dilution setting. The installation additionally comprises a pipe system through which the aqueous solution can be transported from the dosing station to the nozzles.

In a preferred embodiment, the installation according to the invention also contains a water throughflow meter for the fresh water used to prepare the conveyor lubricant solution or the cleaning/disinfecting solution. In this way, the dosing pumps can be adjusted in such a way that they dispense the particular amount of product concentrate required proportionally to the throughflow of water in order to adjust either the conveyor lubricant concentration or the cleaning/disinfecting concentration.

In principle, the switching of the dosing pump or the dosing pumps from conveyor lubricant concentration to cleaning/disinfecting concentration may be carried out by hand at any time. However, the installation according to the invention preferably also comprises an adjustable time switch which alternately switches the first or the second dosing pump on and off after pre-selected time intervals or, in the case of a dosing pump with a reversible dosing ratio, controls adjustment of the conveyor lubricant concentration or the cleaning and/or disinfecting concentration. In this way, the conveyor is able to operate fully automatically. If the installation comprises, for example, separate pumps for adjusting the conveyor lubricant concentration on the one hand and the cleaning/disinfecting concentration on the other hand, the time switch can be adjusted, for example, in such a way that it keeps the first dosing pump in operation for 5 hours and 55 minutes. After this time interval, the first dosing pump is switched off and the second dosing pump is switched on, for example, for a period of 5 minutes. Thereafter the second dosing pump is switched off again and the first dosing pump is switched back on for 5 hours and 55 minutes. In other words, the conveyor is operated for 5 hours and 55 minutes with the product concentrate adjusted to conveyor lubricant concentration and for 5 minutes with the product concentrate adjusted to cleaning/disinfecting concentration without the conveyor having to be switched off for this purpose. In this embodiment, therefore, the conveyor is cleaned and disinfected every 6 hours without the container filling and transport process having to be disrupted. If the installation comprises just one dosing pump of which the dosing ratio can be switched from conveyor lubricant concentration to cleaning/disinfecting concentration, the process takes place in the same way except that the dosing ratio of the pump is adjusted to conveyor lubricant concentration or to cleaning/disinfecting concentration for the particular periods intended.

The installation preferably contains other nozzles by which the underneath of the conveyor and/or guide boxes of the conveyors can be sprayed with the aqueous solution diluted to cleaning/disinfecting concentration. In this way, the conveyor can be thoroughly cleaned and/or disinfected. The nozzles on the underneath of the conveyors and/or in the guide boxes are only opened during the cleaning/disinfecting phases.

All parts of the filling line which come into contact with the product concentrate diluted to cleaning/disinfecting concentration are cleaned and/or disinfected. These include not only the conveyor belt itself, but also the pipe system and the associated nozzles.

Accordingly, the present invention enables conveyors to be operated continuously, i.e. for at least several days, using a single product concentrate without any need for interruptions for cleaning purposes. Accordingly, the present invention relates quite generally to a method of operating an installation for filling containers for holding beverages or foods where the containers are transported on conveyors which enables the container filling and transport process to be carried out continuously without any breaks for cleaning purposes.

Accordingly, the invention affords the following advantages:

1. Conveyor lubrication and cleaning take place with a single correspondingly diluted product. Accordingly, there is no need for additional storage capacity for a separate cleaner/disinfectant
2. Only a single pipe system for conveyor lubricant and cleaner/disinfectant is required.
3. The conveyor lubrication system itself is included in the cleaning measures. In this way, contaminated conveyor lubricant solutions are prevented from being applied to the conveyors.
4. Cleaning and/or disinfection take place without disrupting or interrupting production so that no additional time or labor is required. There are no startup problems either.

Accordingly, the invention leads generally to an increase in production capacity because no extra time is required for cleaning/disinfection and restarting of the line. Production safety is increased because the conveyor lubrication system itself is included in the cleaning/disinfection process.

What is claimed is:

1. A method for lubricating and cleaning a conveyor for filling containers that hold beverages or foods, comprising:

diluting a product concentrate comprising 0.5% to 99.5% by weight of a lubricating component and 0.5% to 90% by weight of a clear solubility improver with water by a first dilution factor to form a lubricating solution, diluting the product concentrate with water by a second dilution factor to form a cleaning solution, wherein the second dilution factor is 5 to 100 times greater than the first dilution factor, contacting the conveyors with the lubricating solution during operation of the conveyor for filling containers that hold beverages or foods, and contacting the conveyors with the cleaning solution without interrupting the operation of the conveyor for filling containers that hold beverages or foods.

2. The method according to claim 1, wherein the lubricating component comprises at least one of ether amines, ether diamines, ether polyamines, monoamines, diamines, polyamines, imidazole derivatives, and salts thereof, and the clear solubility improver comprises at least one of amphoteric surfactant and ether carboxylic acid.

3. The method according to claim 2, wherein the ether carboxylic acid comprises the following formula:

A) $H_{2n+1}C_n$—(O—CHY—$CH_2$)$_x$—O—($CH_2$)$_y$—COOH     (1)

where Y is hydrogen or a methyl group, n is a number of 10 to 20, x is a number of 1 to 20 and y is a number of 1 to 5, and the amphoteric surfactant comprises at least one of the following formula:

B)
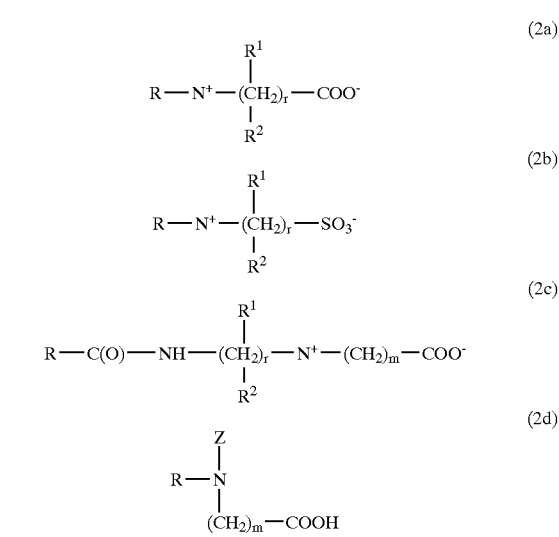

where the substituents R represent a linear or branched, saturated or mono- or polyunsaturated alkyl group containing 8 to 22 carbon atoms, Z has the same meaning as $R^1$ or is a group with the formula —($CH_2$)$_m$—COOH, $R^1$ and $R^2$ independently of one another represent hydrogen, methyl, ethyl, hydroxyethyl or alkoxylate groups and r and m independently of one another are integers of 1 to 6.

4. The method according to claim 1, wherein each component of the lubricating component comprises at least one alkyl group with 6 to 22 carbon atoms.

5. The method according to claim 4, wherein the product concentrate further comprises 1% to 40% by weight of the lubricating component and 1% to 50% by weight of the clear solubility improver.

6. The method according to claim 1, wherein the product concentrate further comprises at least one of nonionic surfactant and amphoteric surfactant.

7. The method according to claim 1, wherein the product concentrate further comprises at least one of alkoxylated fatty amine, fatty alcohol, and alkoxylated fatty alcohol.

8. The method according to claim 1, wherein the water used for diluting the product concentrate by a second dilution factor has a temperature of 5° C. to 80° C.

9. The method according to claim 1, wherein the lubricating component comprises at least one of the following formula:

A) R—NH—($CH_2$)$_r$—$NH_2$     (1a)

R—NH—($CH_2$)$_r$—$N^+H_3$ $X^-$     (1b)

R—$N^+H_2$—($CH_2$)$_r$—$N^+$—$H_3$ $2X^-$     (1c),

B) R—NH—[($CH_2$)$_r$—NH]$_y$—($CH_2$)$_m$—$NH_2$     (2a)

R—NH—[($CH_2$)$_r$—NH]$_y$—($CH_2$)$_m$—$NH_2$·($H^+X^{31}$ )$_n$     (2b)

C) R—O—[($CH_2$)$_r$—NH]$_p$—($CH_2$)$_m$—$NH_2$     (3a)

R—O—[($CH_2$)$_r$—NH]$_p$—($CH_2$)$_m$—$NH_2$·($H^+X^-$)$_n$     (3b)

D) R—$NY_2$     (4)

E)

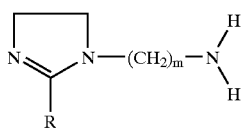

(5)

in which the substituents R represent
a linear or branched, saturated or mono- or polyunsaturated alkyl group containing 6 to 22 carbon atoms,
the substituents Y independently of one another represent hydrogen or a methyl group,
$X^-$ is an equivalent of an anion from the group consisting of amidosulfonate, nitrate, halide, sulfate, hydrogen carbonate, carbonate, phosphate or carboxylate,
m, r and y independently of one another are integers of 1 to 6,
p is 0 or an integer of 1 to 6 and
n in B) is an integer of 1 to 2+y and, in C), an integer of 1 to 1+p.

10. The method according to claim 1, wherein
contacting the conveyors with the lubricating solution comprises spraying with a nozzle the lubricating solution onto a surface of the conveyor,
contacting the conveyors with the cleaning solution comprises spraying with the nozzle the cleaning solution onto the surface of the conveyor,
diluting the product concentrate to form the lubricating solution comprises using a first dosing pump of a dosing station, and
diluting the product concentrate to form the cleaning solution comprises using a second dosing pump of the dosing station.

11. The method according to claim 10, wherein
diluting the product concentrate to form the lubricating solution further comprises using a water throughflow meter, and
diluting the product concentrate to form the cleaning solution further comprises using the water throughflow meter.

12. The method according to claim 10, wherein
diluting the product concentrate to form the lubricating solution further comprises using an adjustable time switch for alternating between the first dosing pump and the second dosing pump, and
diluting the product concentrate to form the cleaning solution further comprises using the adjustable time switch for alternating between the first dosing pump and the second dosing pump.

13. The method according to claim 10, wherein
contacting the conveyors with the cleaning solution further comprises spraying with an underneath nozzle the cleaning solution onto an underside surface of the conveyor.

14. The method according to claim 1, wherein
contacting the conveyors with the lubricating solution comprises spraying with a nozzle the lubricating solution onto a surface of the conveyor,
contacting the conveyors with the cleaning solution comprises spraying with the nozzle the cleaning solution onto the surface of the conveyor,
diluting the product concentrate to form the lubricating solution comprises using a dosing pump of a dosing station, and
diluting the product concentrate to form the cleaning solution comprises using the dosing pump of the dosing station.

15. The method according to claim 14, wherein
diluting the product concentrate to form the lubricating solution further comprises using a water throughflow meter, and
diluting the product concentrate to form the cleaning solution further comprises using the water throughflow meter.

16. The method according to claim 14, wherein
diluting the product concentrate to form the lubricating solution further comprises using an adjustable time switch for changing the dilution factor, and
diluting the product concentrate to form the cleaning solution further comprises using the adjustable time switch for changing the dilution factor.

17. The method according to claim 14, wherein
contacting the conveyors with the cleaning solution further comprises spraying with an underneath nozzle the cleaning solution onto an underside surface of the conveyor.

* * * * *